Figure 2:
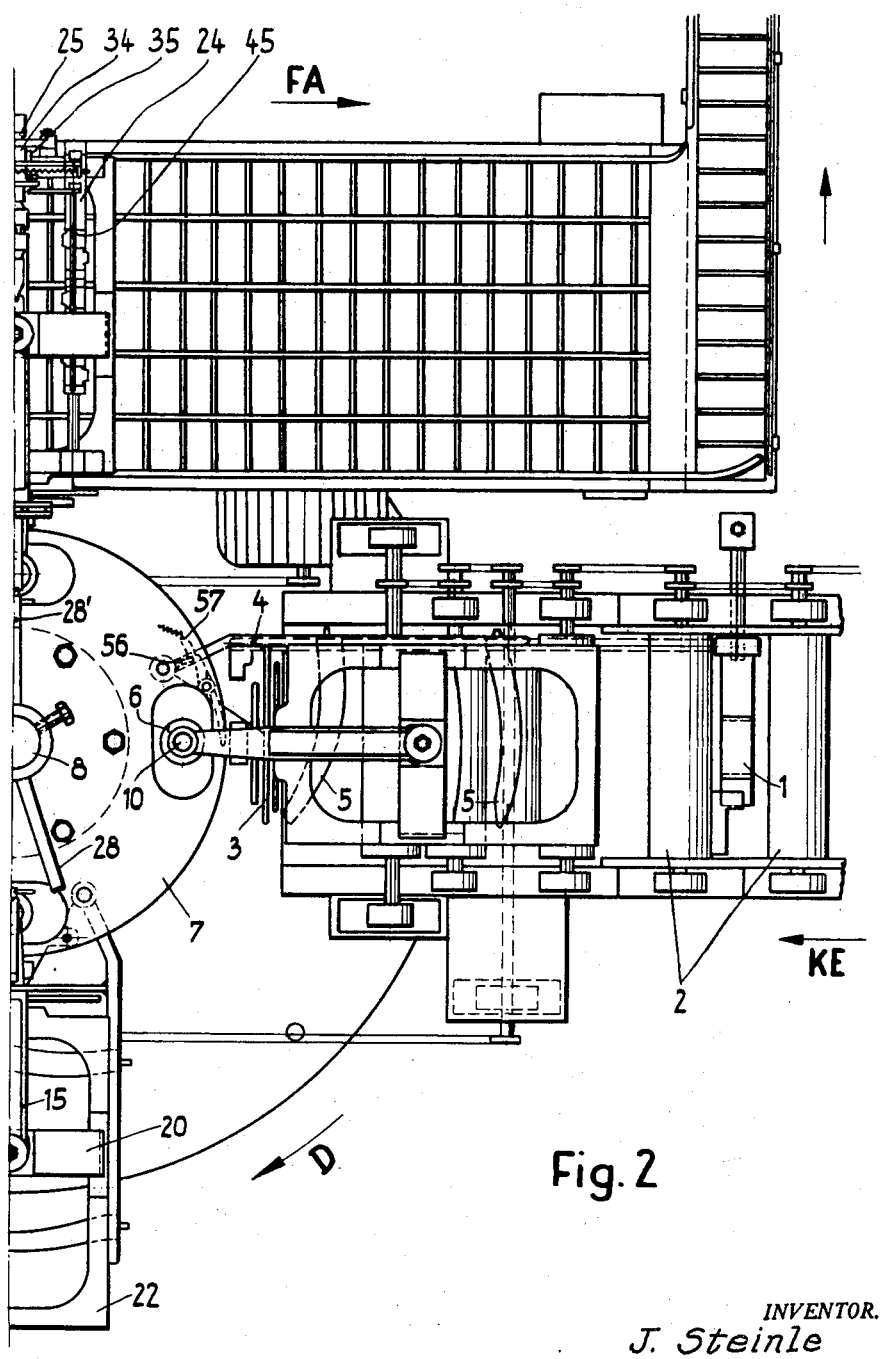

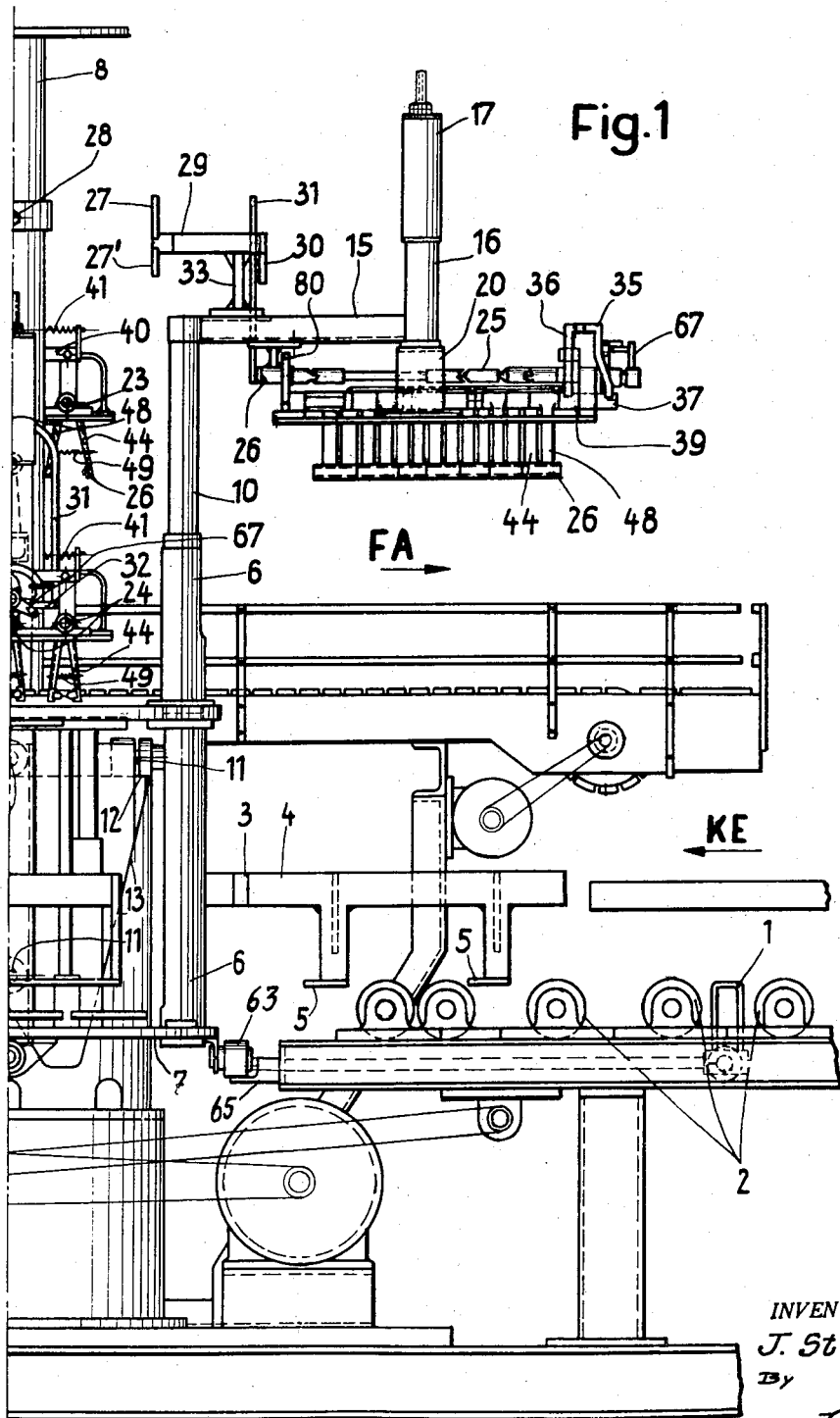

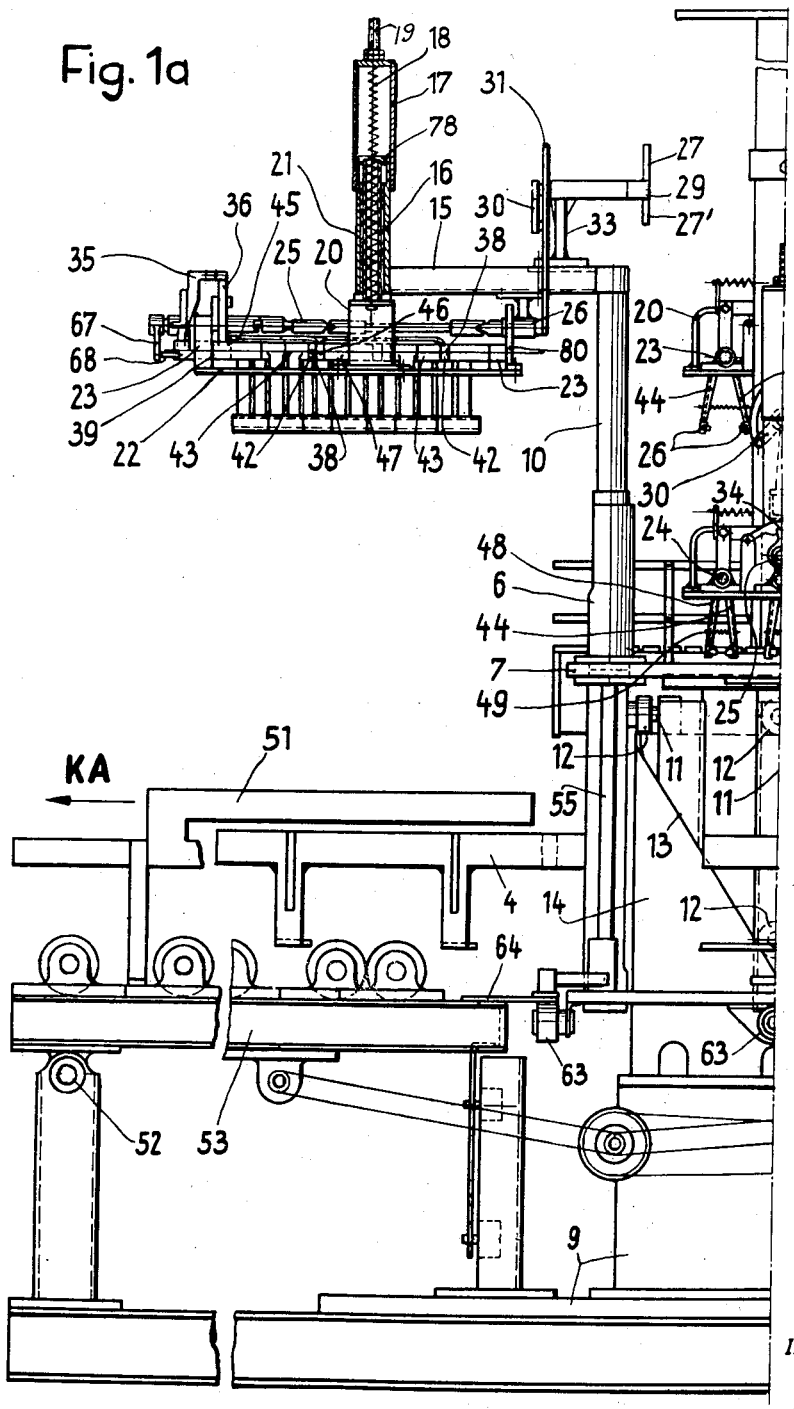

INVENTOR.
J. Steinle

INVENTOR.
Josef Steinle
BY
Lowry & Rinehart
ATTYS.

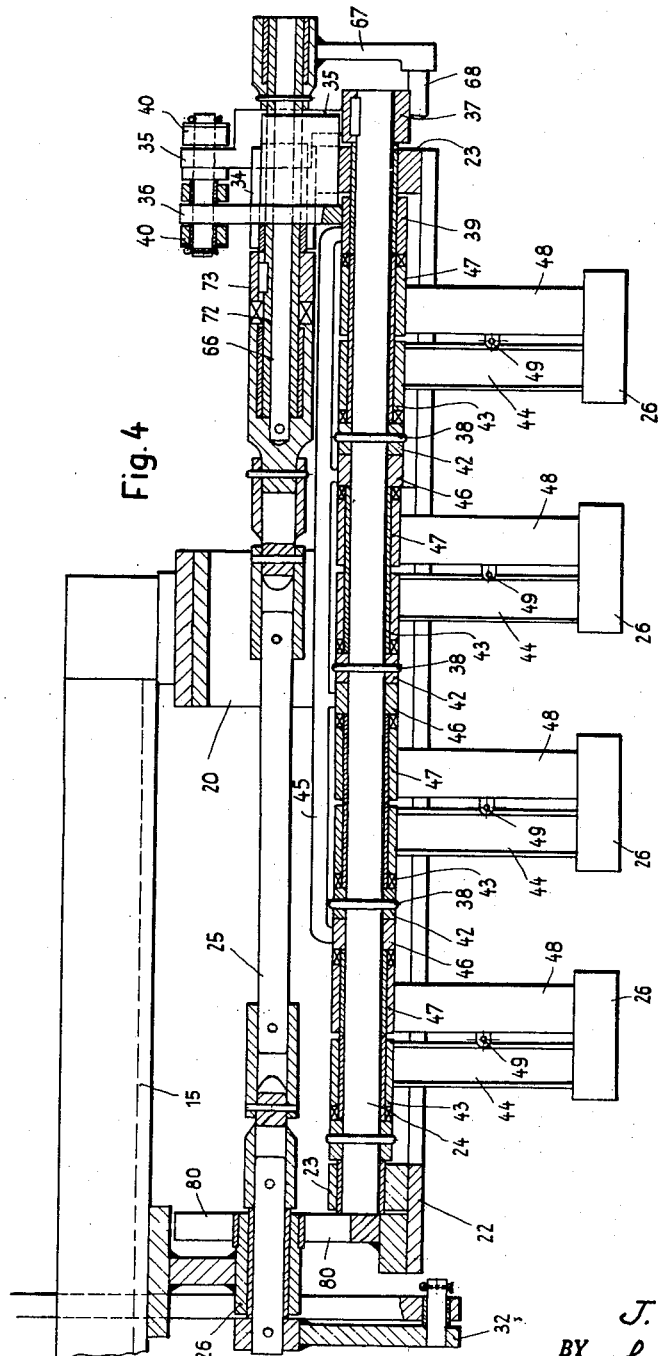

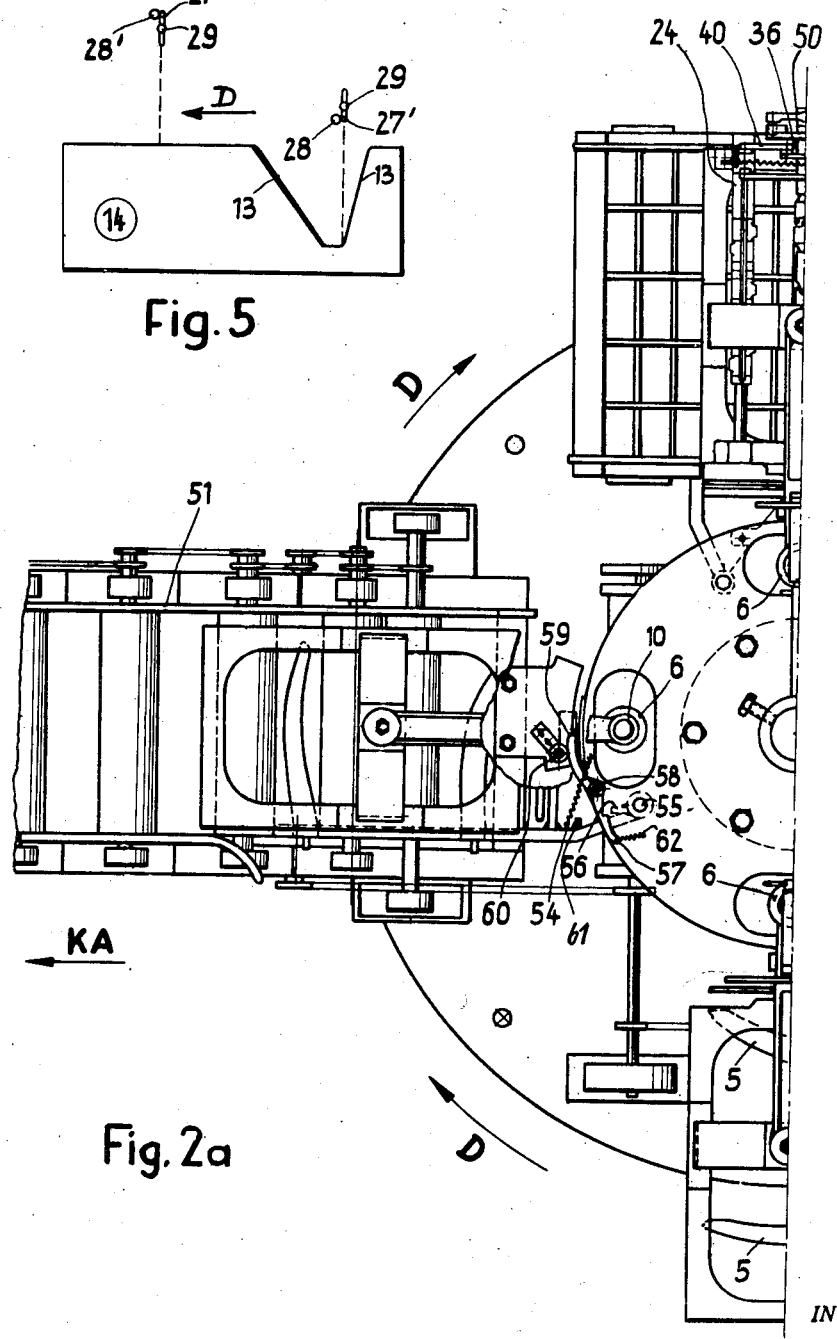

United States Patent Office 2,966,995
Patented Jan. 3, 1961

2,966,995

MACHINE FOR INTRODUCING OR EXTRACTING BOTTLES INTO OR FROM BOTTLE CASES

Josef Steinle, Westheim, Germany, assignor to Certus Maschinenbau G.m.b.H., Augsburg, Germany, a corporation of Germany Filed Oct. 25, 1957, Ser. No. 692,324

Claims priority, application Germany Oct. 30, 1956

8 Claims. (Cl. 214—309)

This invention relates to a machine for introducing or extracting bottles into or from bottle cases.

Machines are known which have continuously operating bottle grippers which move along the path of travel of a belt which travels about two horizontal axes of rotation, the downwardly sloping path of travel of the conveyor belt for the cases being tangent to the arc into which the first-mentioned belt is formed at one of its end guide means; the gripping movement carried out at the tangent point has to be effected instantaneously, and is only possible with low cases from which the bottles project to a considerable extent; the machine cannot be greatly accelerated, since the contact zone is limited to one point on the path of travel. Since however cases are often used whose height is at least the same as that of the bottles, other machines have been developed having bottle grippers which are movable about a vertical axis but do not operate continously but rather with stepwise movements. Their output is therefore limited.

An object of the present invention is to obviate these disadvantages.

According to the present invention there is provided a machine for extracting bottles from bottle cases, said machine comprising at least one bottle-gripper device adapted to be moved continuously over a closed path of travel about a vertical axis, and entrainment means for entraining bottles fed to said means and adapted for forward movement conjointly with the gripper device over a part at least of the path of travel of said gripper device, said gripper device and entrainment means being arranged also for relative displacement in a vertical sense, one toward and away from the other, during said conjoint movement along the closed path, the arrangement being such that a bottle engaged by the gripper device can be moved therewith either toward or away from the entrainment means.

Thus, the gripping of the bottles can be effected during the course of a relatively long joint partial revolution of the bottle gripper device and entrainment means, and can be made independent of the height of the cases with complete operational security. The output of the machine can be substantially increased, depending on the number of gripper devices arranged about said vertical axis, on the diameter of the path of travel, and on the possible circumferential speed.

Figure 3:
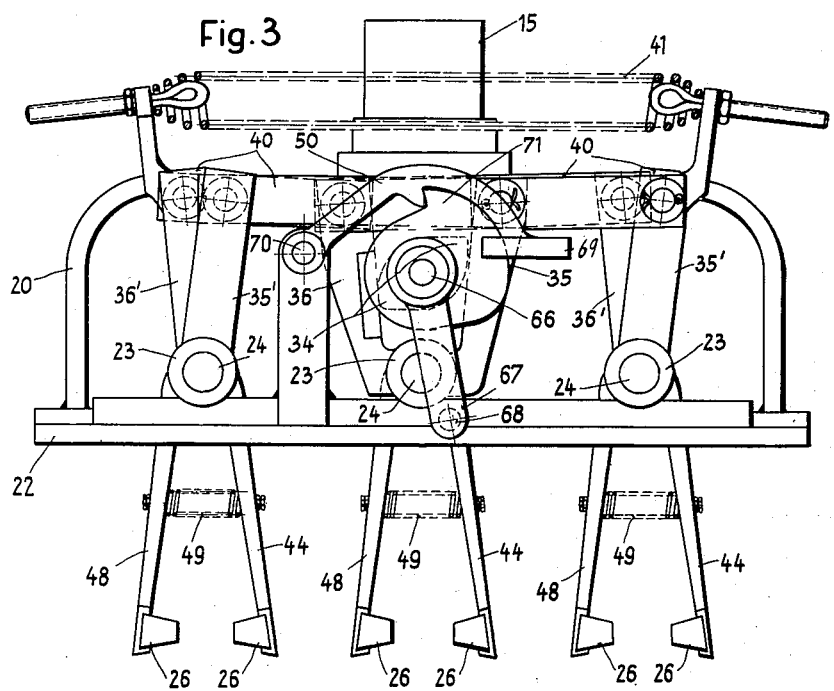

For a better understanding of the invention and to show how the same may be carried into effect, reference will now be made to the accompanying drawings in which:

Figures 1 and 1a are match line vertical sectional views of a machine for extracting bottles from cases, Figures 2 and 2a are match line plan views of the machine shown in Figure 1, Figure 3 is an enlarged end view of a detail of Figure 1, Figure 4 is a further enlarged sectional side view of Figure 3, Figure 5 shows diagrammatically the control means for effecting one revolution.

Referring to Figures 1 to 5 of the drawings, the extracting machine comprises a rotary frame arranged to rotate continuously about a vertical axis and includes four equidistantly spaced case holders. Each case holder comprises a side arm 4, a side stop 3 extending perpendicularly to the arm 4, and two supporting arms 5 which are rigidly connected to the side arm 4 by means of cranked arms. The feeding of cases filled with bottles into the extracting machine is effected in the direction of the arrow KE by a roller conveyor shown at the right hand side of Figures 1 and 2, and the emptied cases are removed from the machine in the direction of the arrow KA by a roller conveyor shown at the left hand side of Figures 1 and 2, the extracted bottles being removed from the machine in the direction FA on a conveyor belt. The feeding of the filled cases to the machine is controlled in accordance with the working rate of the machine by a stop 1 which is synchronized in such a manner between two of the continuously driven rollers 2 that each case is moved in correctly against the side stop 3 of the case holder, so that the leading wall of the case bears in parallel fashion against this side stop 3, whilst the side wall of the case situated perpendicularly adjacent the leading wall bears in parallel manner against the other side arm 4. The upper surface of the two supporting arms 5 are situated slightly beneath the tangential plane of the uppermost peripheral parts, i.e. the peaks, of the rollers 2. The rollers 2 are so arranged that upon rotation of the rotary frame about its vertical axis in the direction of arrow D, the arms 5 will not be impeded by the rollers. During such movement, a case from which have been extracted its bottles will be swept sideways in the direction of the arrow D off its supporting rollers 2 by the arm 4 and on to the supporting arms 5. Each side arm 4 is fixed on a vertical shaft 55. This case holder construction ensures that the cases will always be held in identical positions during the continuous rotary movement, so that uniform alignment with the bottle gripper device situated thereabove will always take place.

The shafts 55 are mounted between two tables 7, 7' of the rotary frame. The two tables 7, 7' are connected fast by four tubular uprights 6 to the rotary frame which rotates about a central column 8 fixed on a machine base 9, and has its bearing at the upper table 7'. Although in the illustrated example there are four tubular uprights 6 with four case holders and four bottle gripper devices on the rotary frame, it is also possible to provide six of each, or any other desired number.

Each tubular upright 6 forms an elongated vertical guide for a tubular column 10 to whose lower end is fixed a pin 11 which projects out of a slot in the upright 6 and carries a roller 12 which bears with the dead weight of the tubular column on a cam track 13 of a fixed casing 14 which is co-axial with the fixed central column 8. When the rotary frame rotates, the tubular column 10 carries out an ascending and descending movement in accordance with the shape of the cam track 13. Since the movement of the column 10 is effected by the dead weight of the gripper device and the column and not positively, no extraction of bottles can take place if the cases containing the bottles are unsuitable, and operational disturbance is avoided.

Fixed on the upper end of each tubular column 10 is a supporting arm 15 on whose outwardly projecting end is fixed a tube 16 on which is fixed a further tube 17 in the top end of which is suspended a spring 18 the tension of which is adjustable at 19. A cage 20 is suspended on the lower end of the tension spring 18, which cage carries a guide tube 21, which surrounds the spring 18 and is guided in the tube 16.

Each cage 20 carries a bottle extractor device. Each bottle gripper device comprises a frame 22 having seven bearings 23 for four shafts, of which three shafts 24 carry pairs of grippers 26 whilst a shaft 25 is arranged as a Cardan shaft whose end nearest the central column 8 of the machine is mounted in a bearing 26 which is fixed on the arm 15 of the tubular column 10 and thus accompanies the latter in its vertical movement since the cage 20 is suspended on the tension spring 18. Thus a control arm 27 which is connected to this end of the Cardan shaft 25 through the intermediary of a shaft 29 reliably comes, during rotation, into the effective range of control noses 28 which are fixed on the central fixed machine column 8 and whereby the arm 27 is pivoted in one or the other direction, depending on whether the relevant control nose 28 is situated above the shaft 29 or therebelow, for the control arm 27 has an extension 27'. The shaft 29 can thus be turned either in the one or the other direction, which turning movement is transmitted, by means of a lever 30 fixed to its outer end and by way of a stirrup-shaped rod 31, to an arm 32 which is fixed on the Cardan shaft 25. The shaft 29 is supported on the supporting arm 15 by means of a column 33.

A double spreader cam 34 is fixed on the outer end of the Cardan shaft 25 (Figures 3, 4). Adjacent each side of the cam 34 there are situated opening arms 35 and 36, of which 35 is fixed on a bushing 37 keyed on to the shaft 24 situated therebelow, and 36 is fixed on a bushing 39 mounted loosely on the shaft 24. A number of connecting bushings 42 are fixed to each of the shafts 24 by means of pins 38, the coupling dogs of the bushings engaging with a certain loose angular play with the associated dogs of connecting bushings 43 on which gripper arms 44 are fixed. Connected fast by means of a rod 45 to the bushing 39 mounted loosely on the shaft 24 are similar connecting bushings 46 whose connecting dogs likewise engage with a certain loose angular play with the associated dogs of connecting bushings 47 on which gripper arms 48 are fixed. A tension spring 49 is suspended between the opposite arms 44, 48 of each pair of gripper arms, the tendency of each spring being to close the grippers 26 which are situated at the end of the gripper arms. All the grippers of each gripper device, i.e. including those which are mounted on the two other shafts 24, are mounted in the same way, the opening arms 35', 36' thereof being connected by a linkage 40 in each case to the first-mentioned opening arms 35, 36. Suspended between the two outermost opening arms 35' on the one hand and 36' on the other hand is a strong tension spring 41 whose tendency is to make all the pairs of opening arms 35, 36 approach one another, so as to open the gripper arms 44, 48 since the force of the tension spring 41 is greater than the combined force of the individual springs 49 which tend to close the grippers. Thus the grippers 26 remain open as long as the double cam 34 does not become effective. In this condition the bottle gripper cradle or cage 20 can, by means of the already described kinematic arrangement, approach the case holder by means of the cam track 13 until the individual grippers penetrate between the bottle necks. The lowest position of this downward movement is defined by the lowest point of the control cam track 13. If then in this position between bottle grippers and case holders the control arm extension 27' encounters a control nose 28, the already described connection system rotates the double spreader cam 34, as a result of which the individual tension springs 49 between the pairs of gripper arms are liberated from the action of the stronger spring 41 and become effective for closing the grippers 26. Each bottle is thus engaged by a pair of grippers, and owing to the loose angular play allowed between the bushings 41, 44 and 46, 47, there remains a certain possibility for the bottles to swing freely. In this way jamming against one another is prevented when the gripper cage 20 is lifted upwards, lifting the bottles out of their case. Further jamming between the bottles and the cases can also be prevented.

The opening position of the double cam 34 is maintained during further rotation independently of the control nose 28 by a locking latch 50 so that the spring 41 remains opened out and cannot exert any influence on the individual springs 49.

In the course of rotation in the direction of arrow D, the emptied case comes to the case removal means at the left hand side of Figure 1, where abutments 51 stop the rotary travel of the case. The removal means comprises a roller conveyor support frame 53 which is pivotable about a shaft 52 and which is lowered before the arrival of the case so that the tops of the rollers are situated below the bottom of the case, and is raised at the instant when the case comes to be situated above the roller conveyor, so that the driven rollers then entrain the case in the direction of the arrow KA. Since meanwhile the case holder continues its rotary movement, the side arm 4 yields pivotally, in opposition to the force of a spring 54 anchored on the rotary table 7, about its vertical shaft 55 just after an arm 56 rigidly connected to the side arm 4 has been released by a locking arm 57 which is moved about a pivot 58 by a fixedly mounted roller 60 acting on an arm 59 forming an extension of the locking arm 57. After removal of the case, the spring 54 returns the side arm 4 to its normal position determined by an adjustable abutment 61, in which position the locking arm 57 again engages behind the arm 56 under the action of a spring 62.

Four rollers 63 are mounted on the underside of the rotary table 7 which rollers co-operate with a rail 64 at the inner end of the roller conveyor support frame 53 to lift the latter in the appropriate rhythm, and also control the stop 1 of the case feeding means to the right hand side of Figure 1 by means of a lever arm 65.

When, during further rotation in the direction D, the control arm 27 of the bottle extractor device which is laden with bottles from the case which has been removed from the machine at KA, contacts the control nose 23', the Cardan shaft 25 is rotated, in a counter-clockwise direction when viewing the outer end of the shaft 25, as in Figure 3. In this operation, a stub shaft 66 which is pinned in play-free manner to the Cardan shaft 25 entrains a lever 67 whose nose 68 lifts an abutment 69 of the latch 50 which is pivotable about an axis 70. This operation releases a locking dog 71 whose hollow carrier shaft 72 carries the double spreader cam 34 and is connected to the Cardan shaft 25 by way of a connecting sleeve 73 with relatively considerable free angular play. Owing to this looseness of the coupling, the result is achieved that when the Cardan shaft 25 is rotated the lever 67 is rocked in advance of the rotation of the spreader cam 34, so that upon clockwise rotation the locking latch 50 is first of all made free to come into locking action, and upon anti-clockwise rotation the latch 50 is released first of all so that the spring 41 is capable of pulling together all the connected opening arms 35, 36, entraining the liberated opening cam 34, whereat the Cardan shaft 25 does not need to be co-rotated.

Upon the spring 41 coming into action, all the gripper arms 44, 48 are opened out in opposition to the force of the individual springs 49, so that all the bottles are suddenly deposited on the bottle discharge belt. Being relieved of the weight of the bottles, the spring 18 lifts the bottle cage 20, which spring had yielded downwardly upon gripping and lifting the bottles to an extent limited by stop means 78 (Figure 1) on the guide 21, 16. The cage 20 is raised upwards once more by this same extent, so that the grippers 26 are suddenly lifted over the bottle heads and cannot in their continuous rotary movement collide with the bottles being discharged along the belt in the direction FA. The bottle cage 20 is suspended in vertically displaceable manner by the guide 21, 16 and is prevented from rotating therein by a fork 80 which is fixed on the cage frame 22 and engages about the bearing 26 fixed on the arm 15.

I claim:

1. A machine for handling bottles and cases comprising the combination of at least one bottle gripper means having a continuous vertically cyclic movement about a vertical axis and having simultaneous movement along a continuous closed horizontal path of travel, horizontally rotatable bottle case entrainment means simultaneously operated in timed relation with said bottle gripper means and having a horizontal path of travel for carrying a bottle case therealong from a case-receiving station to a case discharge station, the path of travel of said entrainment means periodically coinciding with the path of travel of said bottle gripper means intermediately of the path of travel of said entrainment means from a bottle-loading station of said bottle gripper means, said bottle gripper means and the case discharge station having a bottle-unloading station in its path of travel subsequent to the case-discharge station, and control means operatively connected to said bottle gripper means for timing and synchronizing movement of said bottle gripper means and bottle entrainment means.

2. A machine as defined in claim 1 including combined vertically slidable and rotatable column means, means securing said bottle gripper means to said column means, said control means comprising guide means including a cam track mounted in concentric relationship with respect to said column means, and a roller mounted on said column means and engageable with said cam track for controlling the vertically slidable movement of said column means.

3. A machine as set forth in claim 1 wherein said entrainment means includes a side arm and supporting arms, said side arm including stop means for a bottle case moved into contact therewith and said supporting arms extend beneath said side arms for supportingly engaging the bottom of said bottle case.

4. A machine as defined in claim 3 wherein said side arm is resiliently mounted, whereby said side arm being movable to sweep a bottle case onto said supporting arm at the case receiving station, and means permitting a rearward yielding of the side arm with respect to the directional movement of the bottle case entrainment means upon arrival of the entrainment means at the case discharge station.

5. A machine as defined in claim 4 wherein said discharge station includes a roller conveyor means having a part vertically positionable in intersecting relation with the horizontal path of travel of said entrainment means at the discharge station for lifting the bottle case off of the said supporting arms, said part being lowered beneath the horizontal path of travel of said entrainment means after removal of the bottle case, and means operatively connected to said part for synchronizing the movements of said entrainment means part with said roller conveyor means.

6. A machine as defined in claim 1 wherein said bottle gripper means comprises a carrier, a plurality of bottle grippers supportingly mounted on said carrier, and a vertical guide means for said carrier, said guide means also being provided with spring means yieldable under the weight of bottles held by the said bottle grippers, the carrier and the grippers being vertically positionable along the said guide means.

7. A machine as defined in claim 6 including a second spring means resiliently biasing each of said bottle grippers to a closed position to be locked about the bottles engaged by the bottle grippers.

8. A machine as defined in claim 7 including common means overcoming the action of said spring means to effect a release of the bottle grippers from the bottles, and timed operating means operatively connected to said common means for actuating said common means at a predetermined time.

References Cited in the file of this patent

UNITED STATES PATENTS

| 2,431,320 | Fischer | Nov. 25, 1947 |
| 2,635,773 | Ardell | Apr. 21, 1953 |
| 2,696,927 | Copping | Dec. 14, 1954 |

FOREIGN PATENTS

| 1,105,261 | France | June 29, 1955 |